Figure 1:
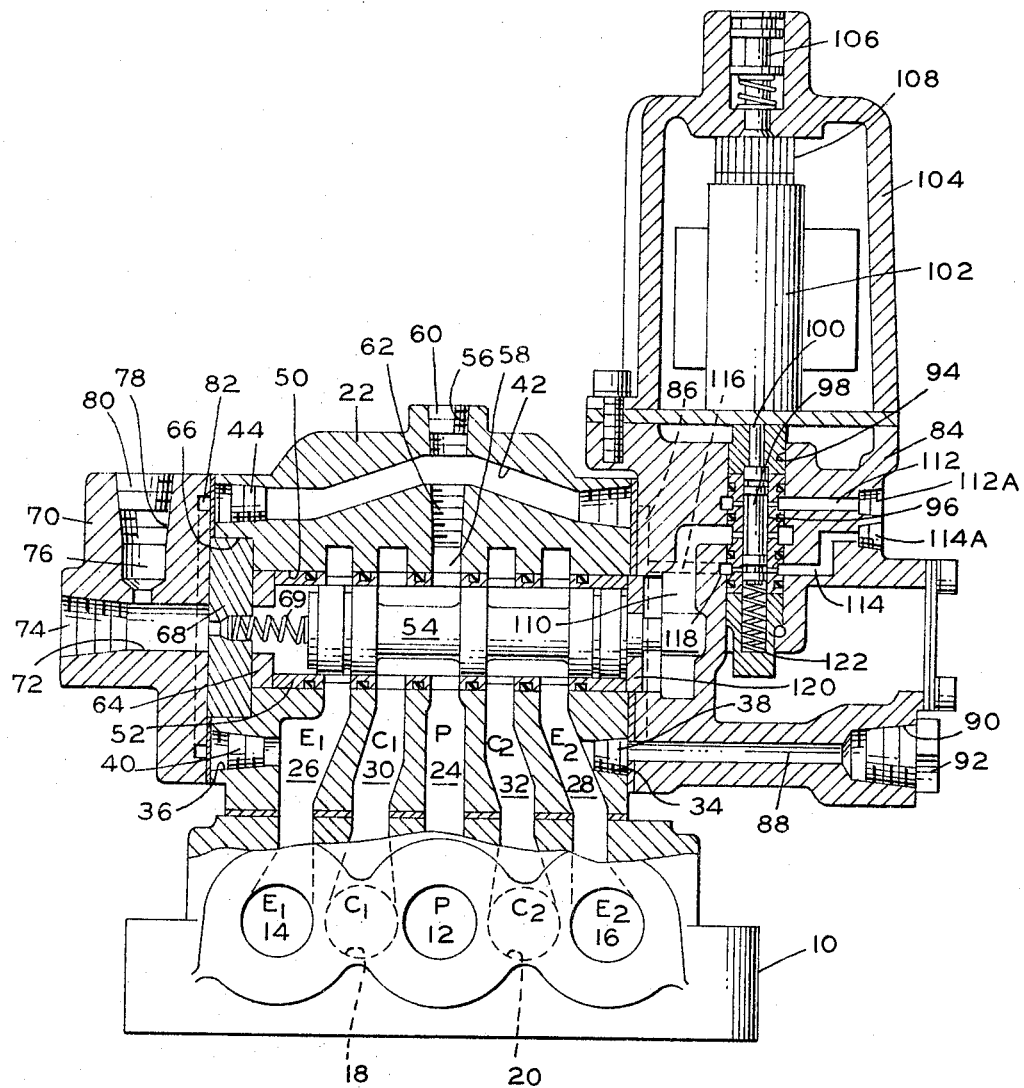

INVENTOR
WILLIAM CARLS
BY
Barnes, Kisselle, Raisch & Choate
ATTORNEYS

Sept. 6, 1966  W. CARLS  3,270,776
SOLENOID VALVE CONSTRUCTION
Filed June 10, 1965  4 Sheets-Sheet 2

INVENTOR.
WILLIAM CARLS
BY
Barnes, Kisselle, Raisch & Choate
ATTORNEYS

*INVENTOR.*
WILLIAM CARLS
BY
Barnes, Kisselle, Raisch & Choate
*ATTORNEYS*

Sept. 6, 1966 W. CARLS 3,270,776
SOLENOID VALVE CONSTRUCTION
Filed June 10, 1965 4 Sheets-Sheet 4
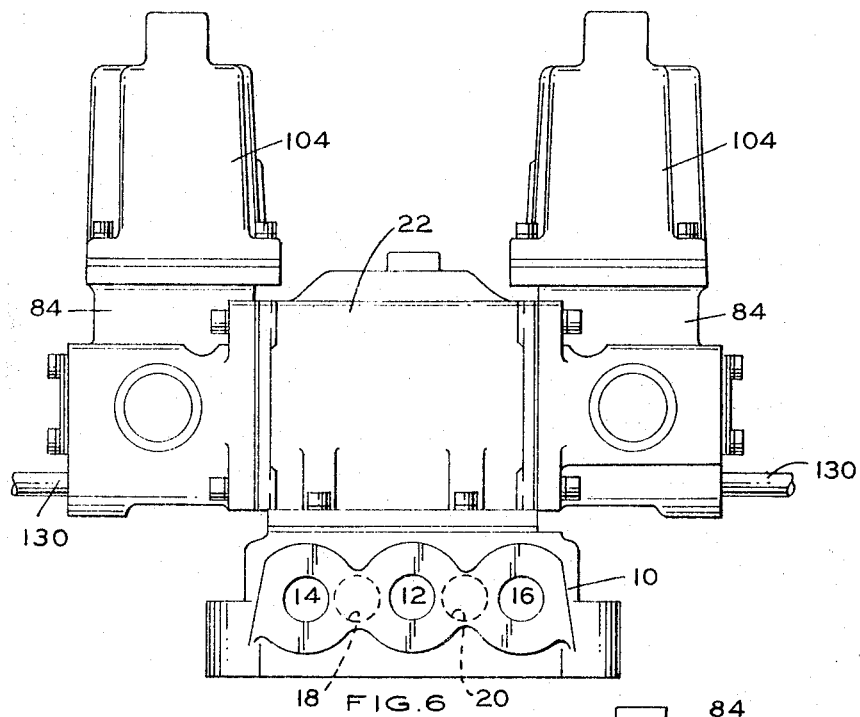
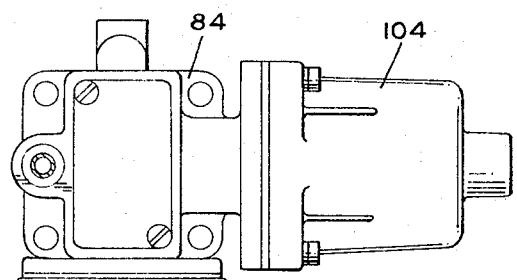
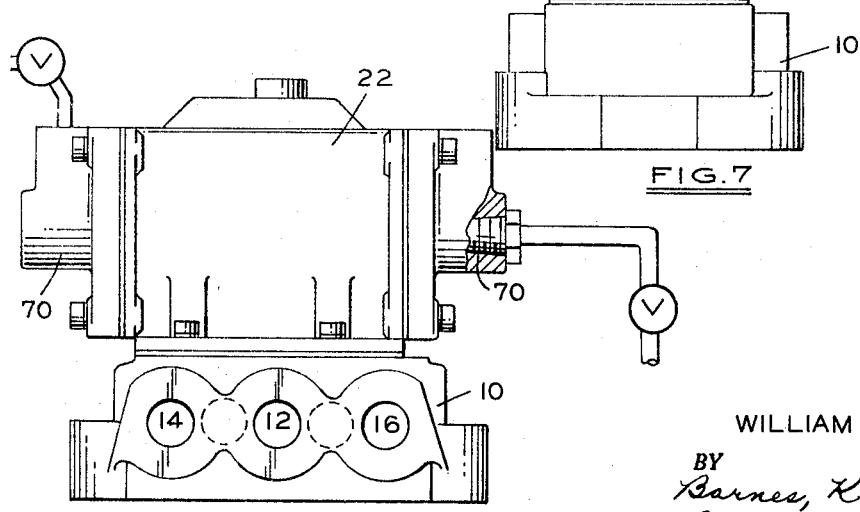
INVENTOR.
WILLIAM CARLS
BY
Barnes, Kisselle,
Raisch & Choate
ATTORNEYS United States Patent Office 3,270,776
Patented Sept. 6, 1966

3,270,776
SOLENOID VALVE CONSTRUCTION
William Carls, % Numatic Inc., Highland, Mich.
Filed June 10, 1965, Ser. No. 462,885
4 Claims. (Cl. 137—625.64)

This application is a continuation-in-part of my copending application Serial No. 295,980, filed July 18, 1963, and now abandoned.

This invention relates to a solenoid valve construction and in particular to a combination of a valve housing and accessories therefor which render the unit adaptable for a large variety of different operations in a pneumatic circuit.

Due to the many different requirements for valve operations in various pneumatic control circuits, it is often difficult to stock a large variety of different valve housings and valve spools to accommodate a separate valve to each particular condition. This not only involves a inventory of valves but also a large capital investment in order to be able to supply valves as required.

It is an object of the present invention to provide a valve wherein a basic housing with certain accessories can perform many different functions and be controlled in many different ways to adapt to the various requirements for the valve.

It is an object of the present invention to provide a valve wherein accessories can be mounted in different positions with respect to the valve to permit mounting of the valve in various accommodating positions at a particular location.

It is a further object of the invention to provide a valve which can be operated directly by electrical solenoid and indirectly by a solenoid controlled pilot system directly adjacent the valve and also by a remote pilot system.

It is another object of the invention to provide a valve housing with a variety of passages which can be used alternately and selectively to accommodate the valve to a variety of circuits and functions and also to permit the use of optional and multiple pressure sources for use in the valve itself.

Another object of the invention is the provision of a valve housing construction which can be mounted either on a valve manifold with a plurality of valve units or on a single valve mount housing.

Another object is the provision of a valve housing wherein a detent control can easily be inserted when this is desired.

Other objects and features of the invention relating to details of construction and operation will be apparent in the following description and claims.

Drawings accompany the disclosure and the various views thereof may be briefly described as:

FIGURE 1, a sectional view of a solenoid-operated, pilot-control operating valve.

Figure 2:
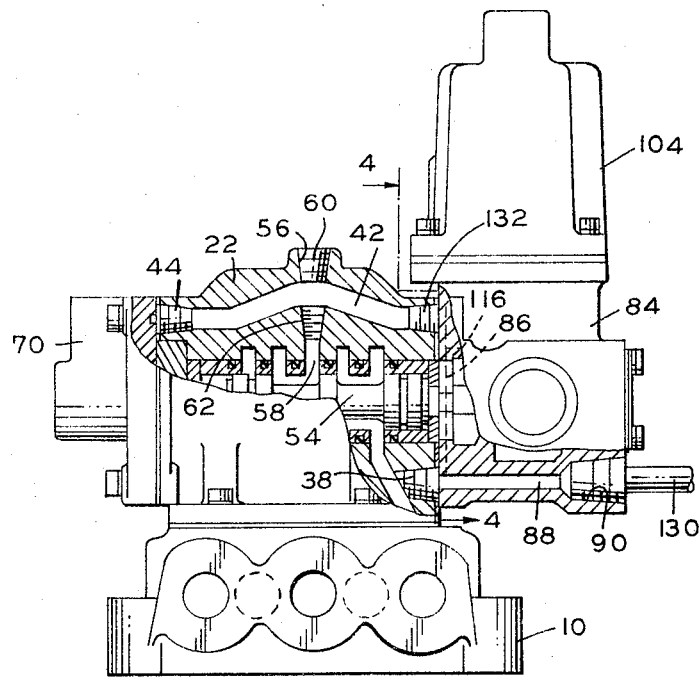

FIGURE 2, a view of a valve assembly partially in section showing a modified circuit use.

Figure 3:
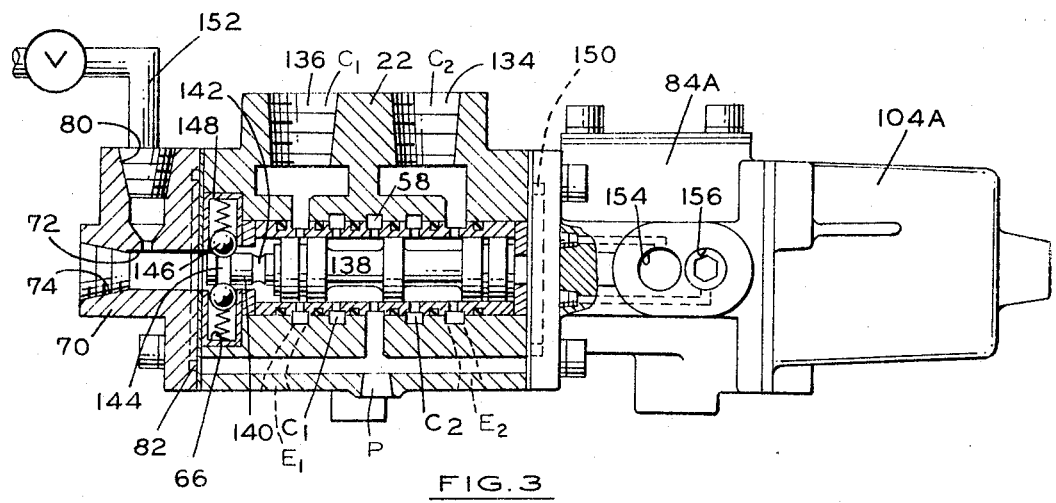

FIGURE 3, a view partially in section showing the use of the valve with a solenoid pilot operation in an aligned relationship.

Figure 4:
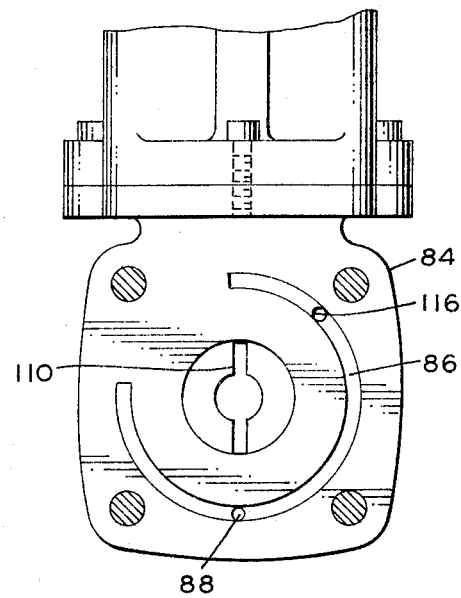

FIGURE 4, a sectional view on line 4—4 of FIGURE 2.

Figure 5:
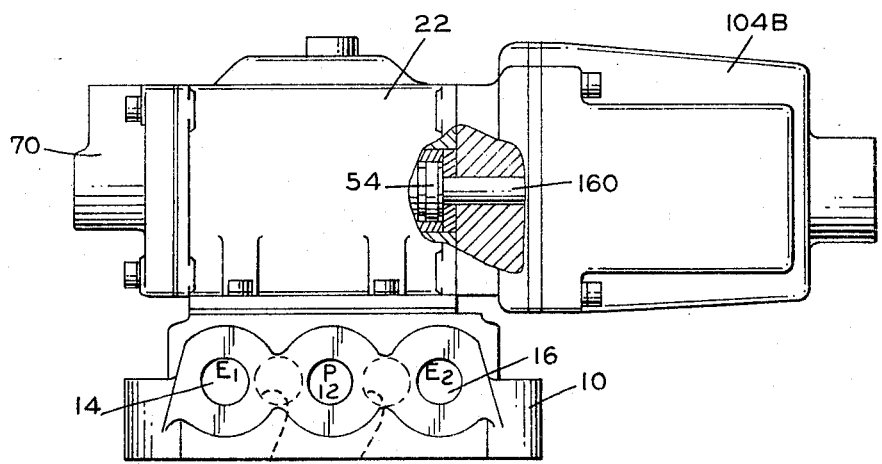

FIGURE 5, a view of a valve showing a direct solenoid control.

FIGURE 6, a view of a valve housing showing a double solenoid pilot control system.

FIGURE 7, a view of a valve similar to that shown in FIGURE 6 with one of the solenoid and valve housings rotated 90°.

FIGURE 8, a view of a valve housing utilizing remote control pilot accessories at each time.

Referring to the drawings:

In FIGURE 1, there is shown a main valve housing wherein the spool, slidable therein, is controlled at one end by pilot pressure from a solenoid-operated valve which is spring returned.

In more detail, in FIGURE 1, a base 10 has a pressure port 12, a first exhaust port 14 and a second exhaust port 16. This valve base also has cylinder ports 18 and 20. The main valve housing 22 rests on the base 10 with a suitable gasket seal and has bottom ports to register with the ports of the base. These include a pressure port 24, a first exhaust port 26, a second exhaust port 28, a first cylinder port 30 and a second cylinder port 32. Corresponding exhaust, cylinder, and pressure ports $E_1$, $E_2$, $C_1$, $C_2$ and P are shown in base 10 and housing 22 in FIGURES 1 and 5. At the end of the valve housing 22 adjacent the bottom, there are two axial passages 34 and 36 each closed by plugs 38 and 40 for the present control duty. At the top of the valve, an axial passage 42 extends between the ends of the valve, this passage being closed at one end by a plug 44 and open at the other end to a pilot control valve housing later to be described.

Within the valve housing 22 is a main bore 50 which contains a sleeve 52 suitably provided with spaced ports therein to register with the pressure, exhaust, and cylinder ports previously described. The sleeve 50 is fitted very loosely within the housing 22 in a manner to have no metal-to-metal contact radially and provided with spaced O-rings to support the sleeve resiliently within the housing in a manner described in my U.S. Patent No. 3,152,614. Within the sleeve 52 is an accurately fitted sliding spool 54 having suitable lands so that a cylinder and a pressure port are connected at one position at the same time that the other cylinder port and an exhaust port are connected as shown in FIGURE 1. In the shifted position, the pressure port connects to the other cylinder port and the previously pressured cylinder port is connected to exhaust. At the top of the valve is a bore 56 which extends down to join the annular passage 58 connected to the pressure port 24. This passage is plugged at its outer end by a plug 60 and is also tapped at 62 so that a plug may be inserted at this point when desired.

At the left-hand end of valve housing 22 within the bore 50 is a circular apertured disc 64 which positions one end of the sleeve 52 and outside of this bore 50 is a larger cylindrical recess 66 which in FIGURE 1 contains a cylindrical plug plate 68 which serves as a seat for a spring 69 bearing against the left-hand end of spool 54. The plug plate 68 which is centrally apertured to provide an escape passage, is retained in position by an end housing 70 having an axial passage 72 with a tapped end portion 74 and a radial passage 76 with a tapped end portion 78 containing a plug 80.

The inner surface of the end cap housing 70 has an arcuate groove 82 which can connect the port 36 with the left-hand end of passage 42 when desired. Mounted on the right-hand end of valve housing 22 is a pilot accessory block 84 having a face lying flat against the right-hand face of valve block 22 and sealed with a suitable gasket. This face of the valve block 84 has an arcuate passage 86 which at one point registers with the right-hand end of passage 42 and at another point registers with the short passage 34 of valve block 22. The block 84 has a straight passage 88 with a tapped port 90 containing a plug 92. This passage 88 aligns with the port 34 of block 22 for an alternate function when desired.

A central bore 94 in block 84 contains a valve sleeve 96 which supports a slidable valve spool 98 operated by the armature pin 100 of a solenoid 102 mounted in a solenoid housing 104. A manual pushbutton 106 in the end of the housing 104 is provided for the solenoid armature 108. The valve 98 is intended to connect control passage 110 at the end of the valve spool 54 with either of two passages 112 or 114 extending to the bore 94 from the outside of the block 84. At the de-energized position of the solenoid 102 as illustrated in FIGURE 1, passage 110 is connected to passage 112 which serves as an exhaust passage to port 112A. Control pressure can either be introduced at a port 114A through passage 114 from an external source or it can pass from the pressure port 58 through the tapped passage 62 and the passage 42 to a passage 116 leading to the annular port 118 which registers also with the passage 114.

As shown in FIGURE 4, passage 116 connects to the arcuate passage 86. A circular opening in the face of valve block 84 partially receives an apertured disc 120 at the end of the valve sleeve 52. A return spring 122 acts on the bottom end of the valve spool 98.

Thus, it will be seen that pilot pressure in the assembly shown in FIGURE 1 is actually furnished from the main pressure port for the valve and controlled by the pilot spool 98. Energization of the solenoid 102 will cause the armature to drive the pilot spool 98 downwardly permitting pressure from the port 118 to pass into the pilot chamber 110 moving the valve 54 to the left against the spring 69, thus providing the necessary valve function to control the cylinder and exhaust ports of the valve block 22. De-energization of the solenoid 102 will cause the parts to return to the position shown in FIGURE 1.

As an example of the versatility of the valve as shown in FIGURE 1, the opening 112 is described as an atmospheric outlet and with this arrangement, the pilot valve is in what is termed a "normally open" position so that only when the solenoid is energized does the pressure reach the right-hand end of valve spool 54. It may be desirable, however, to have the valve spool 54 move to the left by air pressure in which case the tapped port 112A at the end of the passage 112 is connected to a source of pressure. With the pilot valve spool 98 in the position shown, the pressure can feed directly to the right-hand end of valve spool 54 and move it to the left.

Under these circumstances, when the solenoid is energized, the actuating pressure from passage 112 is cut off and the pressure from port 110 is then discharged through port 118 and the passage 114 shown closed by the plug 114A. This same relief may also be obtained through the passage 110, the arcuate passage 86, and passage 88 through the tapped hole 90 if passage 42 is plugged at the right-hand end.

The versatility of the valve is also illustrated in FIGURE 2 where a pressure connection 130 is connected into port 90 leading to passage 88, the plug 92 having been removed from port 90. This passage 88 as shown in FIGURE 4 connects also to the arcuate passage 86 so that pilot pressure could pass again to passage 116 leading to the valve port 118 of valve 98. Thus, another source of pilot pressure is available under conditions where it would be inconvenient to reach the valve 98 in any other way.

It will be appreciated that these valves are very often mounted in large numbers and in accessible places on large machines so that many times it is impossible to provide pilot pressure through passage 114. There are also installations where an extremely high pressure is controlled by the main valve 54 and it is desirable to use a much lower pressure in the pilot system. Under these circumstances, it is not advantageous to carry pilot pressure from the main pressure port 58. When a connection such as shown in FIGURE 2 is used, the passage 42 will be blocked by a plug 132.

In FIGURE 3, a horizontal section of the valve is shown with a modified operation structure. In this case, the same end housing 70 is applied on the left-hand end of the valve and the exhaust ports are shown at 134 and 136. A slightly different valve spool 138 has an extension 140 provided with double grooves 142 and 144 which cooperate with ball detents 146 spring backed in a cylindrical detent case 148, this case being substituted for the plate plug 68 in cylindrical recess 66. In this embodiment, a modified pilot valve housing 84A is mounted in such a way that the valve axis is in line with the valve 138 and a solenoid assembly 104A is mounted on the housing 84A. The face mounting of the housing 84A has an arcuate passage 150 which serves the same function as similar passages 82 and 86 previously described.

Since the detent type of valve is used in FIGURE 3 and the solenoid has a single directional force, it is essential that a means be provided to return the valve 138 to its right-hand position as shown in FIGURE 3. This is accomplished through the end housing 70 having the central bore 72 which can be connected to pressure supply either through the opening 74 which is shown plugged in this instance or the opening 80 which is connected to a remote control valve passage 152.

Openings 154 and 156 in the housing 84A serve the functions which correspond to the openings of passages 112 and 114 as shown in FIGURE 1, and these may be used alternately depending on whether the valve is to be normally open or normally closed.

The valve body 22 may also be used as shown in FIGURE 5 with a direct solenoid control wherein the solenoid body 104B is mounted directly on the valve housing with an end cap 70 at the other end, there being an actuating pin 160 interposed between the solenoid armature and the end of the valve 54.

Also, as shown in FIGURE 6, the valve housing 22 has mounted thereon a solenoid pilot operation at each end of the valve where positive direction is desired with no spring return.

In FIGURE 7, there is illustrated the manner in which the housing 84 can be turned 90° to place the solenoid housing 104 off to one side. The drawing shows the housing turned to the right but it might also be turned 90° to the left. This is sometimes required where head room is not available to have the solenoids upright as shown in FIGURES 1, 2 and 6. The 90° shift is possible by reason of the arcuate passages 86 which provide the same pneumatic relationship regardless of the orientation of the valve body 84.

In FIGURE 8, the valve body is shown with two end housings 70, one at each end of the valve body so that remote control is possible for the operating valve. This system is very frequently desired where there is a possibility of explosion and electrical equipment should be remote from the location of the valve. It will thus be seen that the basic valve housing 22 has many uses as a multi-purpose valve. It can be adapted in the field by simply changing the plugs mentioned to get different flow patterns and can also be utilized either with direct solenoid action, solenoid pilot action, or remote control action. Also, the solenoids may be either mounted in line as shown in FIGURE 3 or in various positions as shown in FIGURES 6 and 7. The solenoid can also be moved 90° to the left or right as shown in FIGURE 7 from the central position. It is also possible to use either an external source of pilot pressure or an internal source of pilot pressure; and if differential pressure is required for cylinder action, it can be fed into the two exhaust ports 134 and 136 of FIGURE 3, using the central cylinder port 58 as an exhaust port.

Differential pressure is sometimes used when a cylinder has a very heavy work stroke in one direction and an easy return stroke. These pressures can be directed to the exhaust port 26 through passage 88 and 34 at one end, and through port 56, passage 42, passage 82 in end housing 70, and port 36. Pilot pressure can then be utilized from passages 86 and 116. Also, the valve can be either a detented valve as shown in FIGURE 3 having two positive positions, or it can be spring-returned or pilot-operated at each end with or without the detent control.

The above-described multiple uses of the valve are not intended to be all inclusive since there are a great number of additional functions which can be achieved with the described passages and ports.

What is claimed as new is:

1. For use in a multi-purpose valve of the spool and sleeve type:
   (a) a main valve housing with two end faces having a main axial bore between said faces with spaced pressure, exhaust and work ports and passages extending from said ports laterally of said bore to a surface of said housing, said housing having also an axial passage extending between said end faces with a lateral passage connecting said axial passage and a pressure port at said bore, said housing having also a short axial passage from each end face extending inwardly to respective exhaust passages, and
   (b) an end housing located respectively at each end face of said main valve housing, each end housing having a common passage connecting the axial passages of said main valve housing terminating respectively at each end face.

2. For use in a multi-purpose valve of the spool and sleeve type:
   (a) a main valve housing with two end faces having a main axial bore between said faces with spaced pressure, exhaust and work ports and passages extending from said ports laterally of said bore to a surface of said housing, said housing having also an axial passage extending between said end faces with a lateral passage connecting said axial passage and a pressure port at said bore, said housing having also an enlarged cylindrical recess at one face end of said bore, said housing having also a short axial passage from each end face extending inwardly to respective exhaust passages,
   (b) an end housing located respectively at each end face of said main valve housing, each end housing having a common passage connecting the axial passages of said main valve housing terminating respectively at each end face, and
   (c) a plug plate in said cylindrical recess to serve as a locator for a valve assembly in said main valve bore and as a spring seat for a valve assembly, said plug plate being retained in position by the said end housing at said one face of said main valve housing.

3. For use in a multi-purpose valve of the spool and sleeve type:
   (a) a main valve housing with two end faces having a main axial bore between said faces with spaced pressure, exhaust and work ports and passages extending from said ports laterally of said bore to a surface of said housing, said housing having also an axial passage between said end faces with a lateral passage connecting said axial passage and a pressure port at said bore, said housing having also an enlarged cylindrical recess at one face end of said bore, said housing having also a short axial passage from each end face extending inwardly to respective exhaust passages,
   (b) an end housing located respectively at each end face of said main valve housing, each end housing having a common passage connecting the axial passages of said main valve housing terminating respectively at each end face,
   (c) a detent assembly in said cylindrical recess having a case to serve as a locator for a valve assembly in said main valve bore, a spring-backed detent in said detent assembly case extending toward the axis of said bore, said case being retained in position by the said end housing at said one face of said main valve housing, and
   (d) a valve spool in said bore having an end extension recessed at axially spaced points to cooperate with said detent.

4. For use in a multi-purpose valve of the spool and sleeve type:
   (a) a main valve housing with two end faces having a main axial bore between said faces with spaced pressure, exhaust and work ports and passages extending from said ports laterally of said bore to a surface of said housing, said housing having also an axial passage extending between said end faces with a lateral passage connecting said axial passage and a pressure port at said bore, said housing having also a short axial passage from each end face extending inwardly to respective exhaust passages,
   (b) an end housing located respectively at each end face of said main valve housing, each end housing having a common passage connecting the axial passages of said main valve housing terminating respectively at each end face, the two end faces of said main housing lying in parallel spaced planes, one of the said end housings comprising a pilot valve housing having a pilot valve bore lying normal to the axis of the main axial bore in the main valve housing, a pilot valve in said pilot valve bore, and
   (c) a solenoid assembly on one side of said one end housing for operating said pilot valve extending in a direction also normal to the axis of the main axial bore, said common passage being arcuate and disposed on a predetermined radius on the face of said one end housing registering with said axial passages in rotation of said end housing and said solenoid assembly about the center of the arcuate passage and the axis of said main valve axial bore to any one of a plurality of positions without interfering with the connection of said common passage and the axial passages of said main housing.

References Cited by the Examiner

UNITED STATES PATENTS

| 2,898,936 | 8/1959 | Collins | 137—625.64 |
| 2,955,617 | 10/1960 | Collins | 137—625.64 |
| 2,982,306 | 5/1961 | Fitzgibbon | 137—625.64 |

M. CARY NELSON, *Primary Examiner.*

HENRY T. KLINKSIEK, *Examiner.*